United States Patent [19]

Irrgang

[11] Patent Number: 5,219,626
[45] Date of Patent: Jun. 15, 1993

[54] MOLDING STRIP, PARTICULARLY FOR VEHICLES

[75] Inventor: Manfred Irrgang, Wuppertal, Fed. Rep. of Germany

[73] Assignee: Gebr. Happich GmbH, Fed. Rep. of Germany

[21] Appl. No.: 612,235

[22] Filed: Nov. 9, 1990

[30] Foreign Application Priority Data

Nov. 11, 1989 [DE] Fed. Rep. of Germany ....... 3937561

[51] Int. Cl.⁵ ............................................. B60R 13/04
[52] U.S. Cl. ........................................ 428/31; 293/128
[58] Field of Search ............... 52/716, 717.1; 428/31, 428/122, 457, 358; 49/490, 496; 293/128

[56] References Cited

U.S. PATENT DOCUMENTS

| | | | |
|---|---|---|---|
| 3,371,447 | 3/1968 | Ruff et al. | 49/490 |
| 4,099,765 | 7/1978 | Bright | 49/490 X |
| 4,107,898 | 8/1978 | Andrzejewski et al. | 52/716 |
| 4,678,696 | 7/1987 | Maeno et al. | 428/358 X |
| 4,745,665 | 5/1988 | Hilsenbeck | 49/491 X |
| 4,749,203 | 6/1988 | Bright | 49/491 X |
| 4,835,031 | 5/1989 | Schroder et al. | 428/122 |
| 4,943,335 | 7/1990 | Schroder et al. | 428/122 X |
| 5,021,279 | 6/1991 | Whitener | 52/716 X |

FOREIGN PATENT DOCUMENTS

| | | |
|---|---|---|
| 0335208 | 3/1989 | European Pat. Off. |
| 3130586 | 4/1982 | Fed. Rep. of Germany |
| 3116339 | 12/1982 | Fed. Rep. of Germany |
| 3633932 | 5/1988 | Fed. Rep. of Germany |
| 3822399 | 7/1988 | Fed. Rep. of Germany |
| 2264689 | 3/1974 | France |
| 2072103 | 9/1981 | United Kingdom |

Primary Examiner—Henry F. Epstein
Attorney, Agent, or Firm—Ostrolenk, Faber, Gerb & Soffen

[57] ABSTRACT

A molding strip, particularly for vehicles, with continuous ends formed thereon. The molding strip is a plastic injection molded part and has an integrated reinforcement which consists of at least one metal strip. The metal strip has a plurality of cut out tongues in rows along one or both lateral edges, and which extend, in whole or in separate regions of the individual tongues, out of the plane of the metal strip. The metal strip can have shaped tongues and unshaped tongues. In a row of tongues which are arranged one behind the other, unshaped tongues alternate with tongues which extend out of the plane of the metal strip at the row of tongues.

26 Claims, 6 Drawing Sheets

MOLDING STRIP, PARTICULARLY FOR VEHICLES

BACKGROUND OF THE INVENTION

The present invention relates to a molding strip, in particular for vehicles, which has transition-less ends formed thereon and is developed as a plastic injection molding and has an integrated reinforcement unit which comprises at least one metal band.

Molding strips of the type described are generally provided with a reinforcement whose purpose is to essentially counteract the high coefficient of thermal expansion of the plastic materials customarily used for molding strips because the temperatures and the changes in temperatures customarily occurring outdoors can cause the length of the strips to change with respect to the metal sheeting of the automobile body to which the molding strips are applied.

In practice, the connection between the plastic material of the molding strips and the usually metallic reinforcing material frequently results in difficulties and requires costly measures. For instance, Federal Republic of Germany DE-C2-31 30 586 describes a method of producing a molding strip in which a separately produced injection molded plastic molding-strip body has a reinforcing body comprised, for instance, of rolled steel sheet. The steel sheet is provided with a coating of coupling agent. The plastic molding strip body is combined with the reinforcing body. The coupling agent is then inductively heated in the cavity of a joining mold to activate the coupling agent and connect together the parts, which rest against each other, under application pressure.

Federal Republic of Germany DE-C2-31 16 339 describes a method of producing molding strips in which a possibly preheated molding strip comprised of stainless steel, aluminum or rigid PVC and coated with primer and coupling agent is placed in a mold cavity and is then covered with PVC in a heated injection mold. The coupling agent is activated, at least in part, by the heat given off by the plastic composition being injected. The production of such molding strips requires an extremely expensive and cost intensive pretreatment of the reinforcements.

This drawback is also true of the object of Federal Republic of Germany DE-A1-38 22 399, which relates to a self-supporting structural part for covering, decorating, protecting and/or sealing of housings or car bodies having at least one transitionless axial end formed thereon. That part comprises a strip shaped or plate shaped plastic body, which rests against the housing via webs and has an integrated reinforcement of hard material as well as soft elastic application elements For this object, the reinforcement comprises narrow strips of sheet metal, which are coated with a hard material or of a mineral- or fiber-reinforced or hard plastic. On the inside of the webs of the structural part, the strips lie against the housing or the like, and are connected permanently to the structural part. The strips have at least one lip of soft elastic material which rests against the housing, or the like. The reinforcing strips are produced by extrusion and the plastic body is injection molded on the reinforcing strips.

SUMMARY OF THE INVENTION

The object of the present invention is to simplify a molding strip of the above described type and make it less expensive and in this connection, to dependably anchor the reinforcement in the plastic material of the molding strip. Furthermore, a simplified recycling of the reinforcement is to be enabled.

To achieve this object, in accordance with the invention, the at least one metal strip reinforcement has a large number of tongues cut into it. At least some of the tongues along at least one side edge of the metal strip extend out of, i.e. above the plane of the metal strip at the array or row. Those tongues extend entirely, or at least individual regions of the tongues, extend out of the plane of the metal strip.

This assures an intimate connection between the reinforcement, on the one hand, and the plastic material of the molding strip covering over the reinforcement, on the other hand, without expensive treatment of the metal strip by primer, coupling agent, or the like. The metal strip is merely inserted into the cavity of an injection mold and is anchored in the plastic material by injection of plastic material into the cavity. The metal strip has tongues which are cut into it, and that at least some of the tongues also extend out of the plane of the metal strip at the array or row of tongues. The tongues which extend out of the plane of the metal strip extend downward or rearward of the molding strip and form the resting points, lines or surfaces for the metal strip against the interior resting surface in the mold, whereby most of the metal strip and of its tongues are spaced from their resting surface in the mold cavity. The metal strip is thus also imparted a favorable placement and arrangement within the body of the molding strip, as in known extruded molding strips. The metal strip used in the molding strip of the invention is thus almost completely embedded in and surrounded by the plastic material of the molding strip. The metal strip can in optimal manner perform its reinforcing purpose, particularly with a view to dimensionally stabilizing the molding strip. This result is especially likely because rigid interlocking occurs between the metal strip, on the one hand, and the plastic material, on the other hand, as a result of the tongues which are cut out and extend out of the plane of the metal.

The invention provides various advantages. First, there is only a mechanical connection of the metal strip to the polymer of the molding strip. Accuracy of length is assured, i.e. the complete taking up of the processing shrinkage of about 10 mm/min. Furthermore, a stabilizing effect (which also occurs in the transverse direction) takes place in order to absorb profile induced mass imbalances (stresses). Stress neutrality between $-35°$ and $+120°$ C. can be achieved. A particular cost advantage results from the elimination of needing the coating to be provided with a coupling agent, which was heretofore deemed necessary. In the prior art, a suitable coupling agent has been used for bonding the metal of the reinforcement to the polymer of the surrounding molding strip. But the coupling agent has led to a material locked connection due to heat activation. A material locked connection, however, makes recycling difficult because the reinforcement is inseparable from the molded material. Furthermore, harmful substances and disposal problems result. Since a coupling agent is unnecessary with the invention, there is a simple possibility of recycling, by melting in the boundary region of the polymer. Such melting is accomplished for instance, by feeding electric current to the metal strip, whereupon the metal strip can easily be detached from the thermoplasts. There is therefore the possibility of an almost residue free separation between the plastic material and the metal strip op the molding strip.

In a further development of the invention, each tongue can be formed between two parallel, spaced apart cuts in the metal strip. The cuts preferably extend transverse to the longitudinal axis of the metal strip, start at one longitudinal, i.e. lateral edge at one side of the strip and terminate before reaching the longitudinal edge on the opposite side of the strip. The metal strip typically has a central web so that the tongues at one side of the web extend transversely of the strip into the web. The tongues which extend in from one longitudinal edge can be located aligned opposite the tongues which extend in from the other longitudinal edge, or the tongues on one side can alternatively be staggered with respect to the tongues along the other side along the strip.

The at least one metal strip preferably has parallel cuts which are alongside each other and which open at the longitudinal edges and which are developed such that an approximately central longitudinally extending web remains. That web is free of cuts and is flanked on both sides by tongues arranged in a row alongside each other. The at least one metal strip preferably has, on one lateral side, unshaped tongues and, on the other lateral side, at least some tongues which extend out of the plane of the metal strip along that row of tongues.

With tongues arranged one after the other in a row, unshaped tongues, i.e. tongues that are generally in the plane of the strip at the row of tongues, can alternate in that row with tongues which extend out of the plane of the metal strip. The tongues which extend out of the plane of the metal strip can in each case have a portion which extends approximately parallel to the plane of the metal strip, i.e. from the surface of the adjacent tongue, but which is spaced from the adjacent surface of the metal strip so as to form a flow slot or channel for the plastic material of the molding strip between the two separated surfaces.

In accordance with a preferred embodiment of the invention, the tongues which extend out of the plane of the metal strip have an undulating section, which overall extends approximately parallel to the plane of the metal strip. Channels are defined by the undulations and are formed between the troughs and peaks of the undulations. These channels are filled by the plastic material of the molding strip. In order to increase stability, the peaks of the undulations should be supported in each case laterally by neighboring unshaped tongues.

Furthermore, the molding strip may have an approximately rectangular cross section, a bottom which is adapted to the connecting surface, and rounded edges. This embodiment is particularly suitable for flat molding strips of slight thickness.

In accordance with another embodiment, the molding strip can also be developed in a generally "hat" shape cross section, comprising one arm, two webs connected to the arm and bent off from it in one direction, and two outwardly protruding flanges, one of which is connected to a free web end. A respective metal strip is embedded in the arm and in each of the flanges. This embodiment is suitable for molding strips of large volume and also takes into account the general need to limit the amount of material used.

The molding strip of the invention can be provided on its bottom with at least one means of attachment to a surface of a vehicle or the like, such as a double faced adhesive tape, which makes rapid and simple assembly to a surface possible.

In accordance with a further embodiment of the invention, the molding strip can have on its rear two webs extending spaced from each other. Two metal strips can be embedded in the molding strip, which also stiffen the webs. For this embodiment of the molding strip of the invention, in a further development of the invention, at least one metal strip is developed as an angle section, and one of the angle arms of the strip is developed with tongues which are arranged alongside each other without spacing. In that angle arm, unshaped tongues alternate with tongues extending out of the plane of the arm at the row of tongues. The other angle arm has tongues arranged in a row alongside each other, but formed by notchings, i.e. removed sections in the metal strip. These tongues are separated by the notches. The notched tongues are in this case also shaped, e.g. they are optionally curved, bent off at their ends, or undulating.

Other features and advantages of the present invention will become apparent from the following description of the invention which refers to the accompanying drawings.

BRIEF DESCRIPTION OF THE DRAWINGS

Embodiments of the invention will be further explained below with reference to the drawings.

DETAILED DESCRIPTION OF THE DRAWINGS

Figure 1:
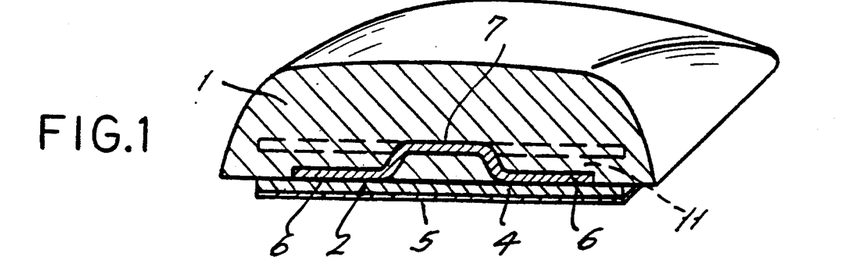
FIG. 1 is a cross section through the end region of a molding strip in accordance with a first embodiment.

FIG. 1 is a cross section through the end region of a molding strip of the type customarily applied on the outside of motor vehicle bodies for protective and/or decorative purposes. The cross section selected, and particularly its external profile, is arbitrary and can be modified or changed in many ways in accordance with the corresponding wishes of the customer.

The molding strip of FIG. 1 comprises a molding body 1 which is produced by injection molding. The body 1 has a reinforcement 2 integrated into it, which is formed from a metal strip 3. The molding body carries a double sided adhesive tape 4 on its bottom which is covered by a temporary protective strip 5 that can be peeled off.

The metal strip 3 of the reinforcement 2 has a large number of parallel cut-out tongues 6 and 8, which extend out of the plane of the metal strip along the row of tongues. The reinforcement 2 comprises a die cut metal strip 3 having a continuous central web 7 extending in the longitudinal direction. On both sides of the web 7 there are formed, practically without spacing between them, cut tongues, which are directed perpendicular to the length of web 7. Shaped tongues 6, i.e. those out of the plane of the strip at the row of tongues, alternate with unshaped tongues 8, i.e. those remaining generally in the plane. The alternating arrangement of the tongues 6 and 8 alongside each other without spacing between them results from the fact that they are separated from each other merely by a die cut, rather than by a stamped out opening. Accordingly, upon the production of the reinforcement 2 (see FIG. 5), the metal strip 3 is provided in a continuous process with die cuts 9, which produces the continuous web 7 and the tongues 6, 8 arranged on both sides of the web. The metal strip 3 is worked with a gang tool which is developed so that both the die cuts 9 and the shaping of the tongues 6 can be effected. In all of the embodiments shown, tongues of the same development arranged one behind the other in a row are present, unshaped tongues 8 and tongues 6 which extend out of the metal strip plane alternate with each other, so that each shaped tongue 6 is followed by an unshaped tongue 8.

Figure 2:
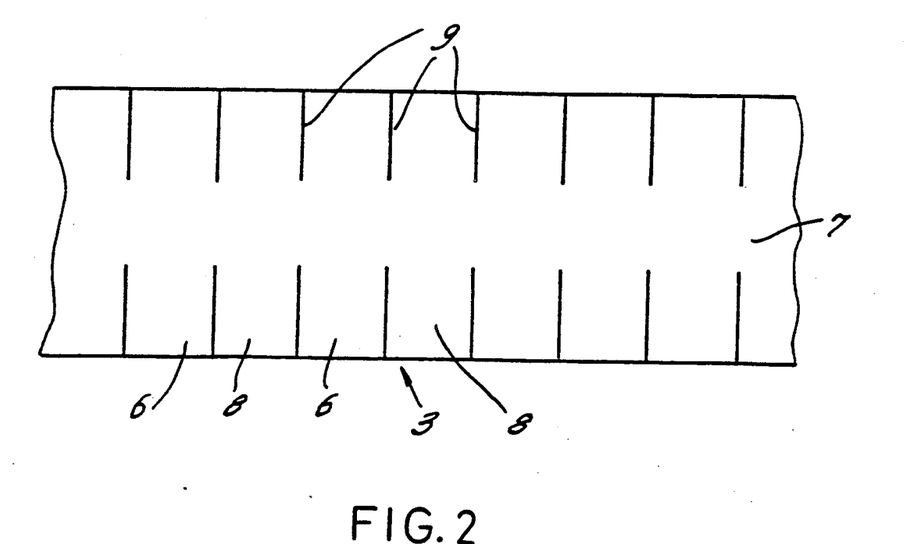
FIG. 2 shows the reinforcement of the molding strip of FIG. 1 in a still unshaped state.
Figure 3:
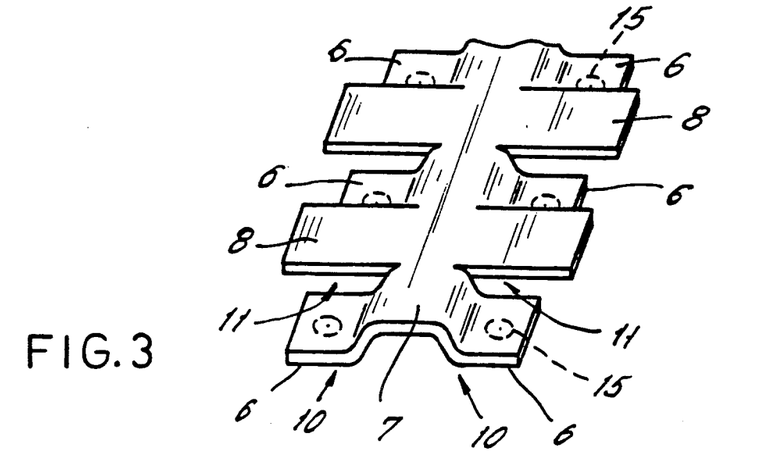
FIG. 3 shows the reinforcement of FIG. 2 in the subsequent shaped state.
Figure 12:
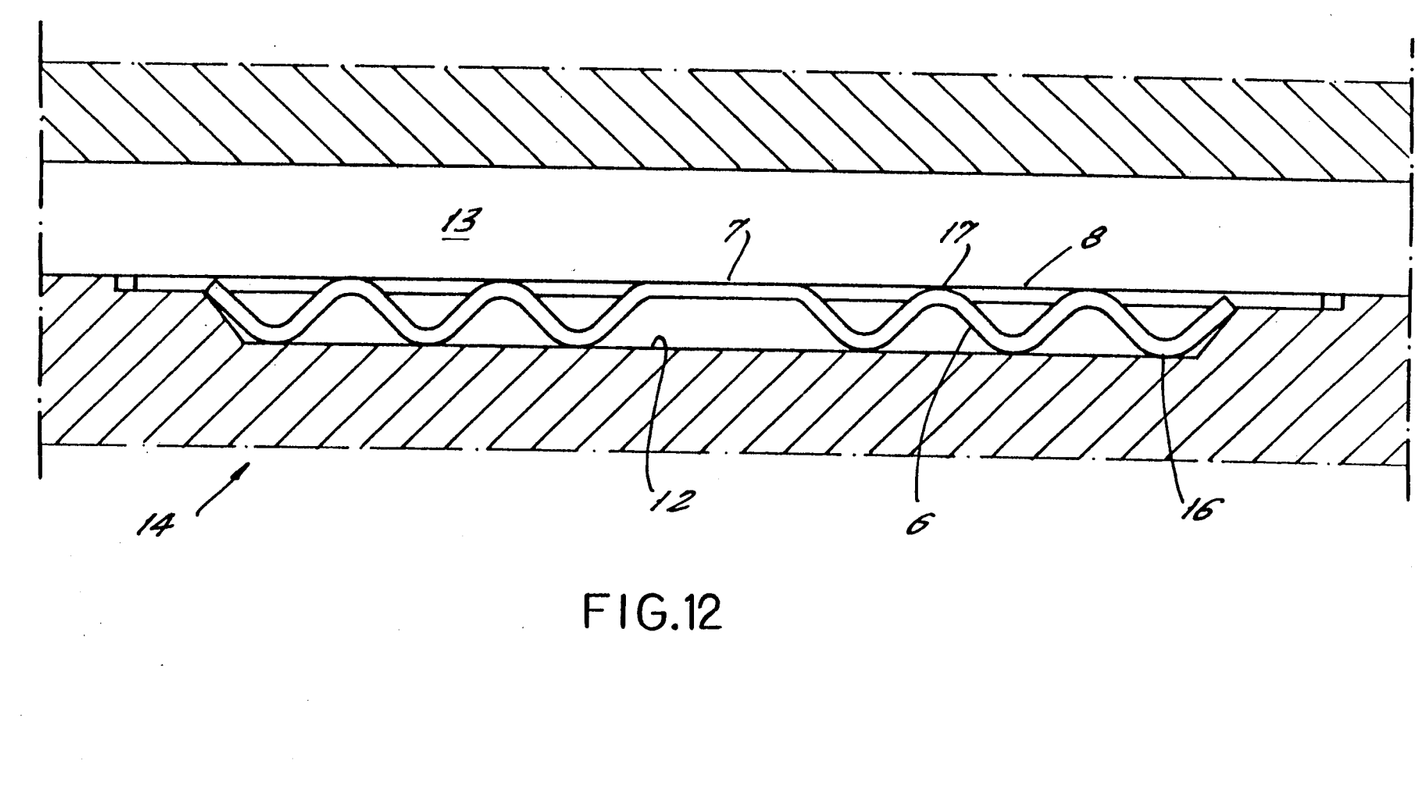
FIG. 12 is a cross section through a device for producing a molding strip.

In the embodiment according to FIGS. 1 to 3, the tongues 6 which extend out of the plane of the metal strip all have a section 10 which extends approximately parallel to the plane of the metal strip and which is spaced from the adjacent surface of the metal strip 3, which is the surface of the adjacent tongue 8. Upon the injection molding, the spacing defines a flow slot 11 or channel for the plastic material of the molding strip. The metal strip sections 10 are intended to rest against a wall 12 in the cavity 13 of an injection mold 14, as shown in FIG. 12 which illustrates one such injection mold cavity. As a result, the tongues 8 and the web 7 of the reinforcement 2 are at a distance from the wall 12 in the cavity 13 of the injection mold 14 and thus became located in the molding body 1 at a corresponding distance from the bottom of the molding body 1 (FIG. 1). Instead of a flat support, a punctiform support can also be provided when the sections 10 are developed with spherical indentations 15.

Figure 4:
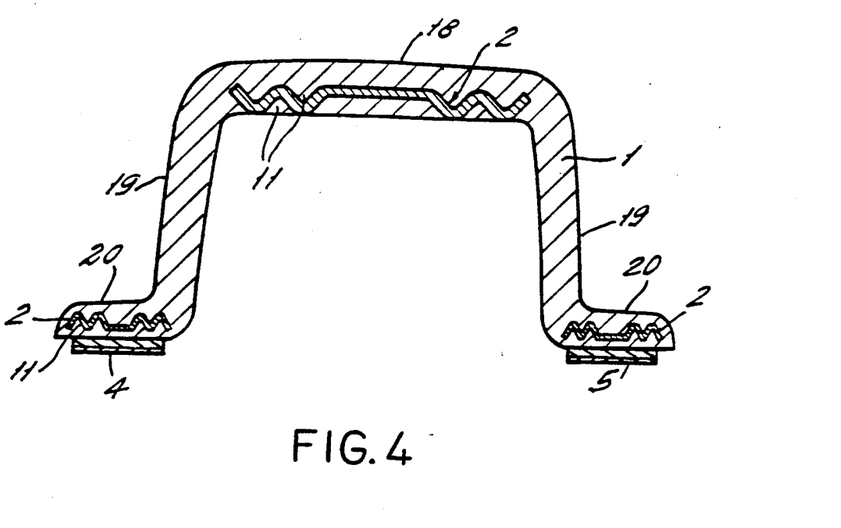
FIG. 4 is a cross section through a molding strip in accordance with a second embodiment.
Figure 5:
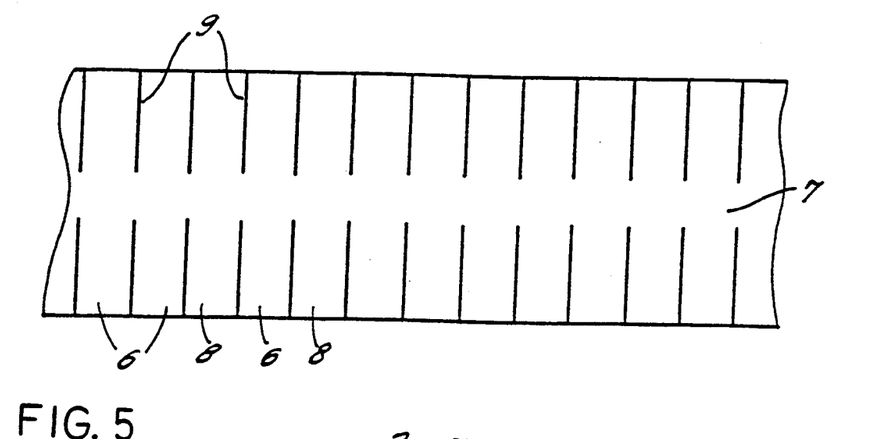
FIG. 5 shows the reinforcement of the molding strip of FIG. 4 in a still unshaped state.
Figure 6:
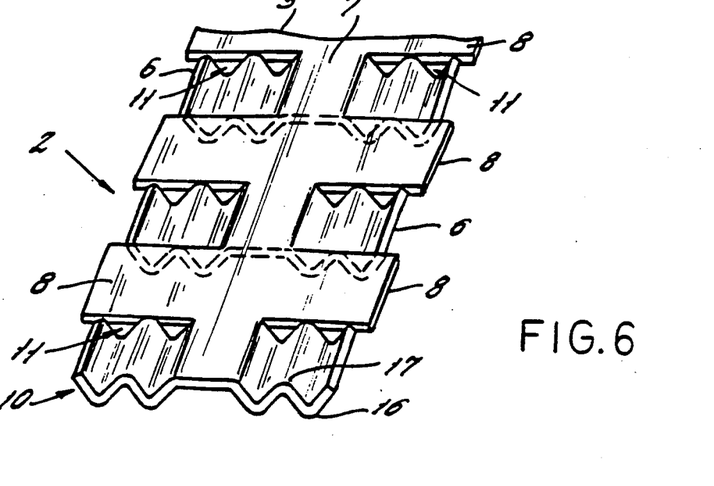
FIG. 6 shows the reinforcement of FIG. 5 in the subsequent shaped state.

The embodiment according to FIGS. 4 to 6 is a molding strip having a molding body 1 which is of "hat" shaped cross section. This molding body is provided with three reinforcements 2, the development of which can be noted from FIG. 6.

In the embodiment of FIGS. 4 to 6, the tongues 6, which extend out of the plane of the metal strip, have, in each case, an undulating section 10 which overall or generally extends approximately parallel to the plane of the metal strip. Channels 11, which are filled by the plastic material of the molding strip, are developed between the troughs 16 and peaks 17 of the undulations. In order to increase the stability, it is furthermore provided that the undulation peaks 17 of the tongues 6 are supported laterally by the unshaped tongues 8. The undulation troughs 16 form the lines of contact along which the reinforcement 2 is supported on the wall 12 in the cavity 13 of the plastic injection mold 14.

The hat shaped molding strip of FIG. 4 comprises a longitudinally extending web 18, two legs 19 connected to the web and extending along the lateral sides of the web, and two laterally outwardly extending flanges 20, each connected to a free web end. Both the web 18 and each of the flanges 20 has a respective reinforcing metal strip 3 embedded in it. A double-sided adhesive tape 4 with a bottom protective strip 5 is arranged on the bottom of each flange 20.

Figure 7:
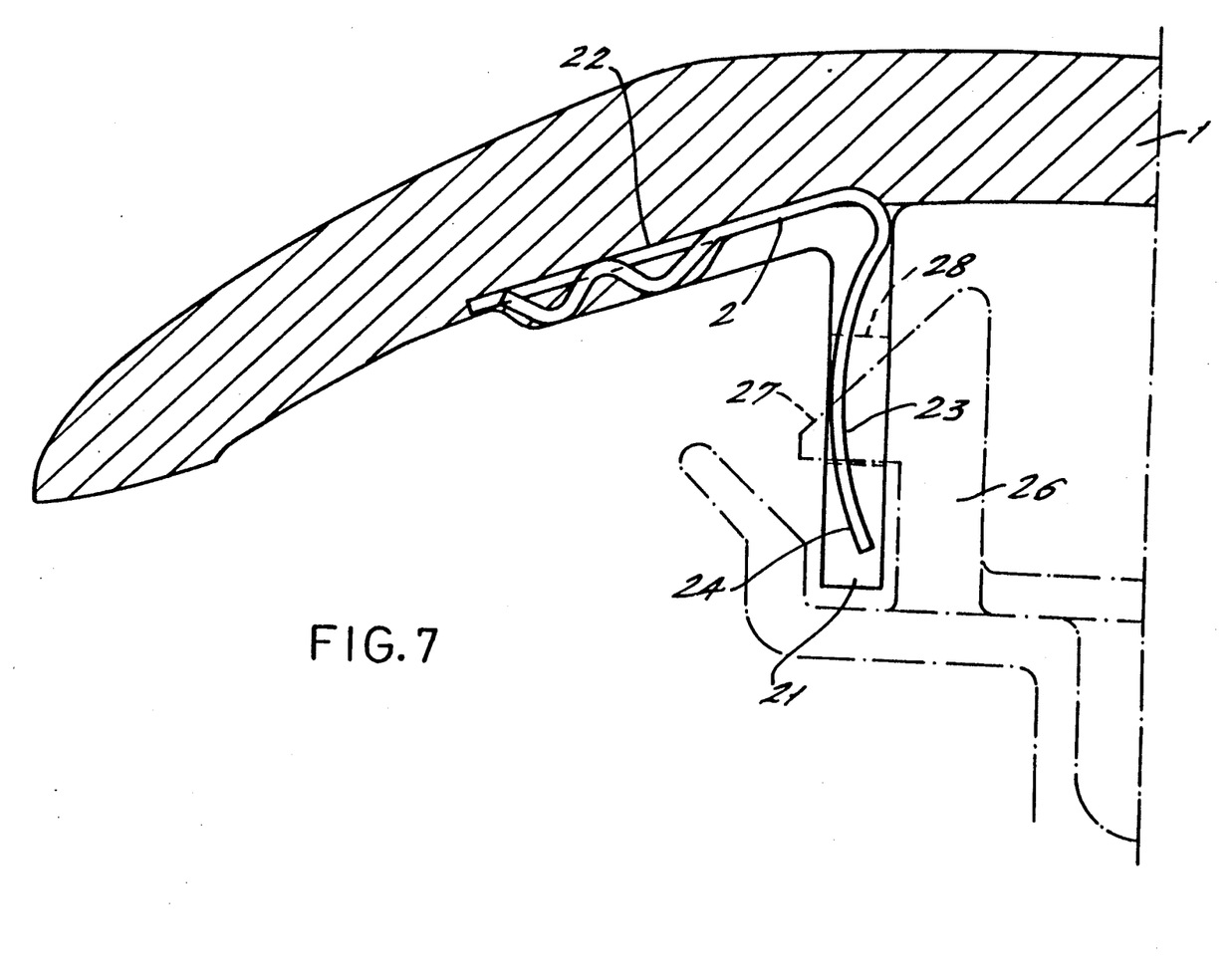
FIG. 7 is a cross section through a molding strip in accordance with a third embodiment.
Figure 8:
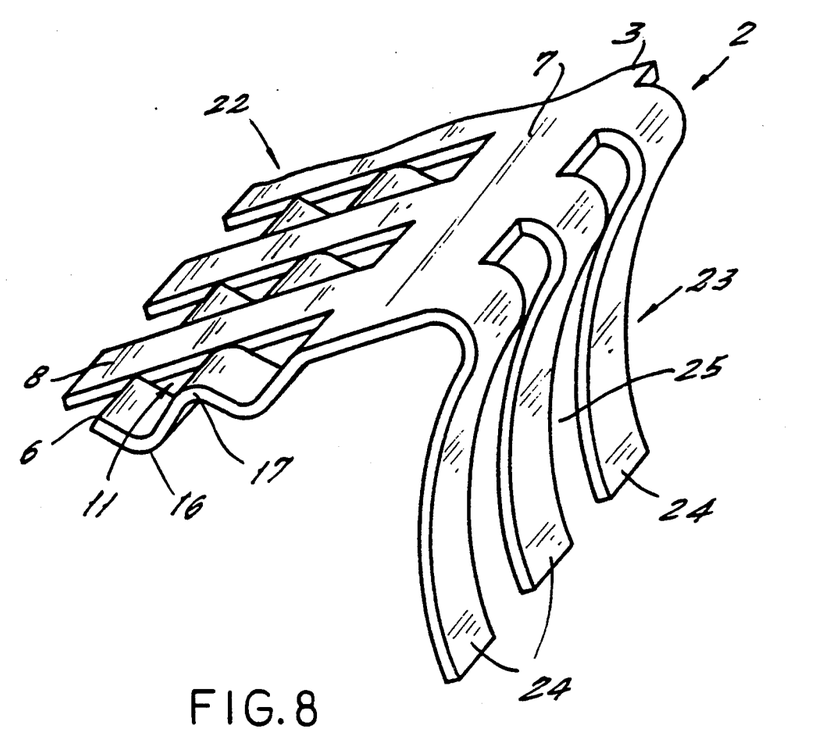
FIG. 8 shows a reinforcement of the molding strip of FIG. 7 in the shaped state.

Only half of the molding strip of FIG. 7 is shown. The other half is symmetrical On its back, the strip has two webs 21 developed on it. Only one web is shown. The reinforcement 2 for the molding strip of FIG. 7 is developed as an angle section. One angle arm 22 is seated in the main part of the molding body 1 and the other angle arm 23 is seated in the web 21. As seen in FIG. 8, only the angle arm 22 is developed with tongues 6, 8 arranged alongside each other without spacing between adjacent tongues. Unshaped tongues 8 alternate with tongues 6, which extend out of the plane of the angle arm. The shaping and arrangement of the tongues 6 and 8 with respect to each other on the first angle arm 22 corresponds to the arrangement in the embodiment of FIG. 6.

The second angle arm 23 of the metal strip 3 in FIG. 8 also has tongues 24 arranged in a row alongside each other. These tongues are formed by open edge notchings 25 in the metal strip 3. The tongues 6, 8 are on one lateral side and the tongues 24 are on the other lateral side of and are separated from each other by the continuous web 7.

Figure 9:
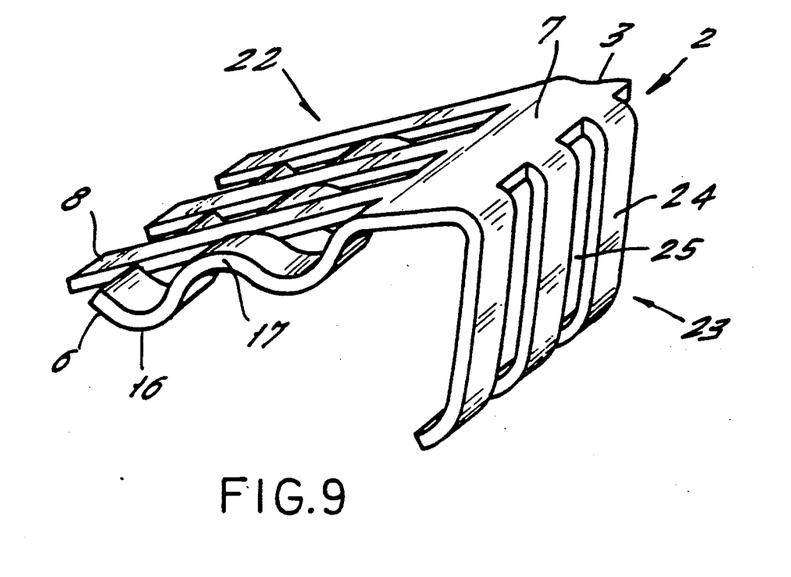
FIG. 9 shows a reinforcement of the molding strip of FIG. 7 in the shaped state and in a modified embodiment, as compared with FIG. 8.

FIGS. 8 and 9 show, in perspective, how the reinforcements 2 for the molding strip of FIG. 7, which are developed as angle sections, can be shaped.

FIG. 7 also shows in dashed lines an installation for the reinforcement. It includes a clip element 26 including a clipping nose 27 which passes through an opening 28 in the web 21 of the molding strip. The openings 28 are distributed over the length of the molding such that they coincide with the notchings 25 (see FIG. 8).

Figures 10, 11:
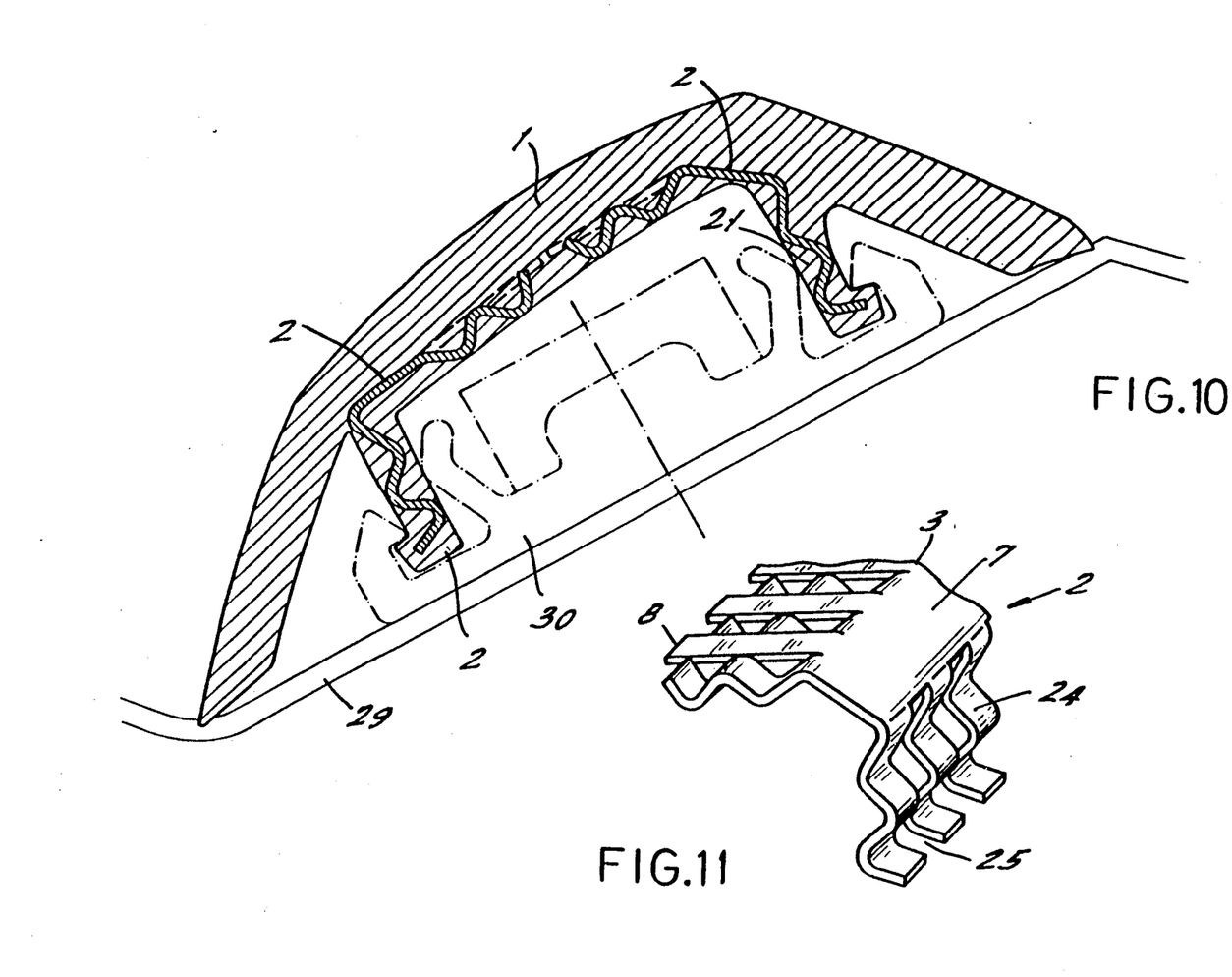
FIG. 10 is a cross section through a molding strip in accordance with a fourth embodiment.
FIG. 11 shows the reinforcement of the molding strip of FIG. 10 in the shaped state.

FIG. 10 shows a molding strip which is attached to an indicated vehicle body wall 29 by clip elements 30 on the wall. The molding strip of FIG. 10 is provided with rearwardly projecting and longitudinally extending webs 21 formed on its back. The free ends of the webs are thickened toward the lateral outside in order to enable a form locked connection with the clip elements on the vehicle body wall. In this molding strip also, two laterally separated reinforcements 2 are provided, each of which stiffens the respective web 21. The reinforcement 2 arranged to the right in FIG. 10 is shown in perspective in FIG. 11. In this case also, the tongues 6 and 8 on the laterally inward side and the tongues 24 on the other laterally outward side are seated to the left and right on the continuous web 7. The primary difference between the reinforcement 2 of FIGS. 10 and 11 and that of FIGS. 7 to 9 is that the tongues 24 in FIGS. 10 and 11 are also developed as undulations.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A molding strip for application to another surface, comprising a plastic injection molded part and a reinforcement integrated into the molded part;

the reinforcement comprising at least one metal strip formed so as to define cut out tongues in the strip; the metal strip being generally in a plane;

in at least a first plurality of the tongues, at least some regions of the tongues extend out of the plane of the metal strip, wherein the metal strip and the reinforcement generally have a longitudinal axis and the tongues extend transversely to the longitudinal axis, the metal strip has longitudinally extending lateral edges and each tongue starts at a respective lateral edge and extends toward but does not reach to the opposite lateral edge, the cuts extend in from their respective lateral edges a distance such that an approximately centrally located longitudinally extending web remains between the cuts in the longitudinal edges, and the web being free of cuts and having lateral sides away from which the respective tongues extend toward the respective lateral edges of the metal strip, and the tongues on each lateral side of the web are arranged alongside each other, the tongues at at least one lateral side of the central web, form one row of tongues which alternate between a tongue which remains in the plane of the metal strip at that row of tongues and a tongue which extends out of the plane of the metal strip at that row of tongues, the tongues that extend out of the plane of the metal strip include a section which extends approximately parallel to the plane of the metal strip at that row of tongues and is spaced above the surface and plane of the metal strip for forming a flow gap between the tongue section and the surface of the metal strip for permitting the passage of plastic material of the molding strip therethrough.

2. The molding strip of claim 1, wherein each of the first plurality of tongues is bent off from the metal strip to be out of the plane of the metal strip.

3. The molding strip of claim 1, wherein in the first plurality thereof, the tongues are bent out of the plane of the metal strip so that at least some region of each of the tongues in the first plurality is out of the plane of the metal strip but the entire tongue is not out of the plane.

4. The molding strip of claim 1, wherein for each tongue in the metal strip, the metal strip has two generally parallel spaced apart cuts formed in it which define the tongue between them.

5. The molding strip of claim 4, wherein the strip and the reinforcement generally have a longitudinal axis and the cuts defining the tongue extend transversely to the longitudinal axis.

6. The molding strip of claim 5, wherein the strip has longitudinally extending lateral edges and each tongue starts at a respective lateral edge and extends toward but does not reach to the opposite lateral edge.

7. The molding strip of claim 1, wherein there are respective tongues extending in from each opposite longitudinally extending lateral edge of the metal strip.

8. The molding strip of claim 7, wherein the tongues on opposite edges are aligned so that a tongue extending in from one lateral edge of the strip is opposite a tongue extending in from the opposite lateral edge of the strip.

9. The molding strip of claim 7, wherein the tongue extending in form one lateral edge of the strip is staggered in position with respect to a tongue extending in from the opposite lateral edge of the metal strip, as seen in the longitudinal direction of the strip.

10. The molding strip of claim 7, wherein for each tongue in the metal strip, the metal strip has two generally parallel spaced apart cuts formed in it which define the tongue between them.

11. The molding strip of claim 1, wherein at least some of the tongues at one lateral side of the web extend out of the plane of the metal strip at that side of the web.

12. The molding strip of claim 11, wherein the tongues at the other side of the web of the metal strip are in the plane of the metal strip.

13. The molding strip of claim 1, wherein the tongues that extend out of the plane of the metal strip have an undulating section, extending outwardly of the central web and approximately parallel to the plane of the metal strip, the undulations having peaks and troughs which are filled by the plastic material of the molding strip.

14. The molding strip of claim 1, wherein the undulations are so shaped that the undulation peaks are laterally supported by the neighboring alternating tongues which are generally in the plane of the metal strip.

15. The molding strip of claim 1, wherein the tongues that extend out of the plane of the metal strip have an undulating section, having undulations outwardly of the central web, and the undulations extend approximately parallel to the plane of the metal strip, the undulations having peaks and troughs which are filled by the plastic material of the molding strip.

16. The molding strip of claim 1, wherein the molding strip has an approximately rectangular cross section, a bottom beneath the molding strip and a reinforcement which is adapted to a surface to which the molding strip is to be applied, and the molding strip has lateral edges which are rounded.

17. The molding strip of claim 1, wherein the molding strip extends longitudinally and has opposite lateral edges, and in a cross section through the lateral edges, the molding strip is generally hat shaped, wherein the hat shape comprises a central web extending longitudinally, a respective leg also extending longitudinally and located at each lateral side of the web and both legs extending in the same direction off the plane of the web and having one end connected to the web and an opposite free end, and a respective laterally outwardly extending flange having an end which is connected to the free end of the leg; a respective one of the metal strips reinforcements being embedded in the web and in each of the flanges.

18. The molding strip of claim 1, wherein the molding strip has a bottom which is adapted to a surface to which the molding strip is to be connected;

attachment means on the bottom of the molding strip for attachment to the connecting surface.

19. The molding strip of claim 18, wherein the attachment means on the bottom of the molding strip comprises double sided adhesive tape.

20. The molding strip of claim 1, wherein the molding strip has a rear for facing toward the surface to which the molding strip is connected and two laterally spaced apart webs projecting from the rear of the molding strip;

a respective metal strip reinforcement embedded in the molding strip and extending into each of the webs.

21. The molding strip of claim 20, wherein at least one of the metal strip reinforcements is developed with an angled cross section which includes first and second angle arms;
  at least one of the angle arms being developed with a row of tongues arranged alongside each other and without spaced between the tongues, the row including tongues extending out of the plane of the strip on the respective angle arm alternating with tongues generally in the plane of the strip.

22. The molding strip of claim 1, wherein the molding strip has a rear facing toward a connecting surface to which the molding strip is applied and the metal strip reinforcement in the molding strip being developed with an angled cross section including first and second angle arms;
  at least one of the angle arms being developed with a row of tongues arranged alongside each other and without spaces between the tongues, the row including tongues extending out of the plane of the strip on the respective angle arm alternating with tongues generally in the plane of the strip.

23. The molding strip of claim 22, wherein the other angle arm of the metal strip also has tongues which are alongside each other in a second row and which are spaced apart by notches in the metal strip along the second row of tongues.

24. The molding strip of claim 23, wherein the tongues in the second row are shaped to be at least in part out of the plane of the metal strip.

25. The molding strip of claim 24, wherein the tongues in the second row that are out of the plane are generally curved.

26. The molding strip of claim 24, wherein the tongues in the second row that are out of the plane are undulating.

* * * * *